(12) United States Patent
Hasegawa (10) Patent No.: US 8,638,842 B2
(45) Date of Patent: Jan. 28, 2014

(54) EQUALIZATION DEVICE, EQUALIZATION METHOD, AND PROGRAM

(75) Inventor: Hideyuki Hasegawa, Tokyo (JP)

(73) Assignee: NEC Corporation, Tokyo (JP)

( * ) Notice: Subject to any disclaimer, the term of this patent is extended or adjusted under 35 U.S.C. 154(b) by 107 days.

(21) Appl. No.: 13/378,632

(22) PCT Filed: Jun. 1, 2010

(86) PCT No.: PCT/JP2010/059257
§ 371 (c)(1),
(2), (4) Date: Dec. 15, 2011

(87) PCT Pub. No.: WO2010/150624
PCT Pub. Date: Dec. 29, 2010

(65) Prior Publication Data
US 2012/0092049 A1    Apr. 19, 2012

(30) Foreign Application Priority Data
Jun. 23, 2009   (JP) ................................. 2009-148629

(51) Int. Cl.
*H03K 5/159* (2006.01)

(52) U.S. Cl.
USPC ........... 375/229; 375/354; 375/359; 375/360; 375/365; 375/368

(58) Field of Classification Search
USPC .................. 375/229–236, 354–370
See application file for complete search history.

(56) References Cited

U.S. PATENT DOCUMENTS 4,805,197 A * 2/1989 Van Der Jagt et al. ........ 375/361

FOREIGN PATENT DOCUMENTS

| JP | 5-198101 A | 8/1993 |
|----|------------|--------|
| JP | 6-97769 A | 4/1994 |
| JP | 8-45185 A | 2/1996 |
| JP | 9-326170 A | 12/1997 |
| JP | 10-22879 A | 1/1998 |
| JP | 10-27433 A | 1/1998 |
| JP | 10-326457 A | 12/1998 |
| JP | 11-225174 A | 8/1999 |

OTHER PUBLICATIONS

International Search Report for PCT/JP2010/059257 mailed Jul. 27, 2010.
J. Ren et al., "Precursor ISI Reduction in High-Speed I/O", 2007 Symposium on VLSI Circuits Digest of Technical Papers, pp. 134-135, Jun. 2007.

(Continued)

*Primary Examiner* — Curtis Odom (57) ABSTRACT

Provided is an equalization device which receives a signal transmitted from a transmission side of the signal as an input signal, and equalizes the deterioration of a wave shape of the received input signal, wherein a bit value indicated by the input signal is judged in accordance with a clock on the basis of the wave shape of the input signal. From judged signals which result from the judgment and which are composed of a plurality of bits, a two-bit transition signal is detected so that the two-bit transition signal has two adjacent bit values having the same value, and bit values located before and after the two adjacent bit values are different from the bit value of the two adjacent bit values, and the phase of the clock is synchronized with the phase of the detected two-bit transition signal.

14 Claims, 9 Drawing Sheets

(56) References Cited

OTHER PUBLICATIONS

V. Stojanovic et al., "Adaptive Equalization and Data Recovery in a Dual-Mode (PAM2/4) Serial Link Transceiver", Symposium on VLSI Circuits, Jun. 2004.

K. Yamaguchi et al., "12Gb/s duobinary signaling with x2 oversampled edge equalization", IEICE Technical Report, vol. 105, No. 96, May 20, 2005.

* cited by examiner

EQUALIZATION DEVICE, EQUALIZATION METHOD, AND PROGRAM

TECHNICAL FIELD

The present invention relates to an equalization device, an equalization method, and a program for equalizing a degradation of the waveform of a signal.

BACKGROUND ART

In recent years, it has become evident that transmission lines are suffering a bandwidth shortage as communication speeds become higher. One problem caused by such a bandwidth shortage of transmission lines is intersymbol interference. Intersymbol interference refers to interference between adjacent signals representing a bit value of 0 or 1 while the signals are being transmitted. Intersymbol interference tends to degrade the waveform of the signals to the extent that it is difficult to determine bit values from an input signal applied to a signal reception side.

One solution to the degradation of the waveform of an input signal is waveform equalization. The waveform equalization refers to a technology for intentionally varying part of the waveform of a signal depending on a degradation of the waveform of the signal due to intersymbol interference.

Figure 1:
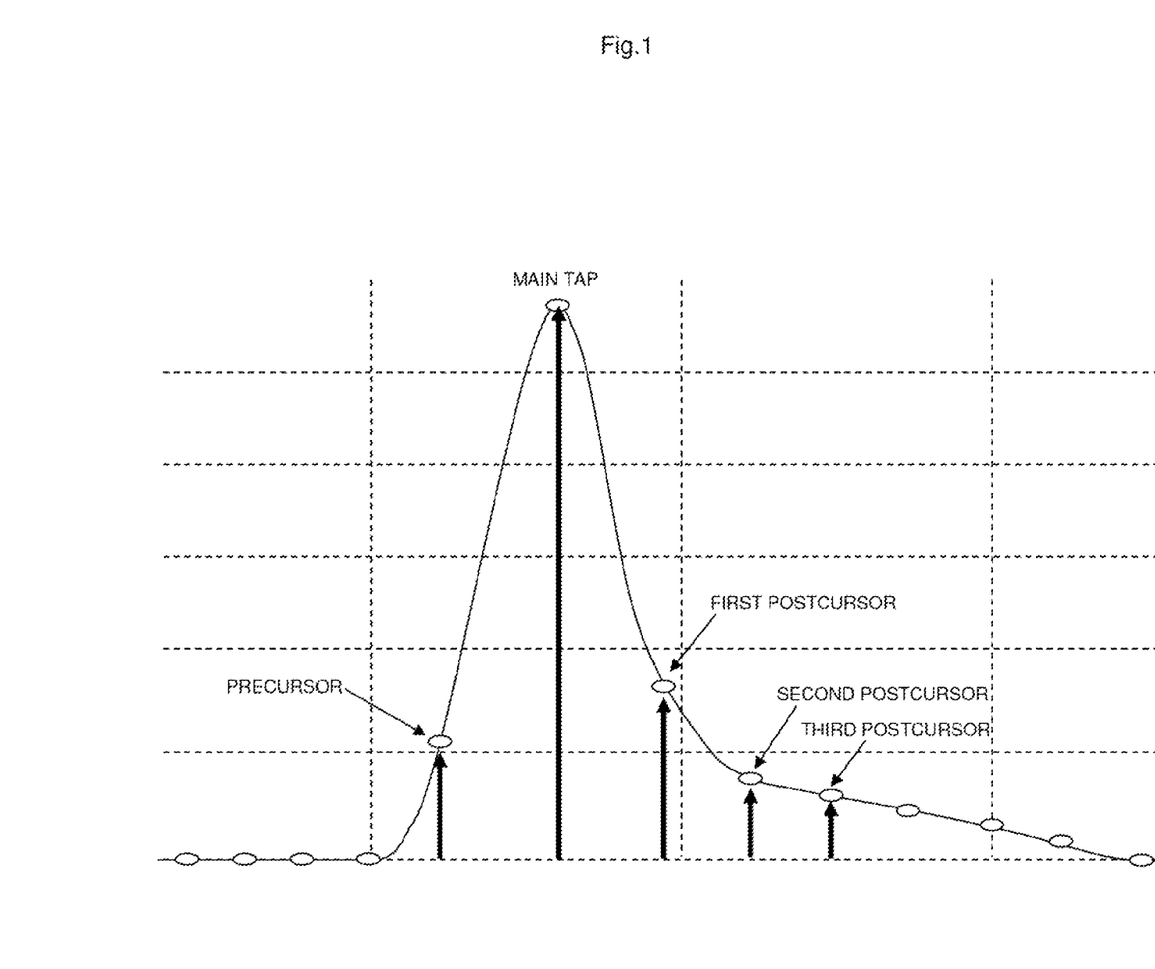
FIG. 1 is a diagram showing an example of an input signal that is degraded due to intersymbol interference.

FIG. 1 is a diagram showing an example of an input signal that is degraded due to intersymbol interference.

As shown in FIG. 1, the degradation of the waveform of an input signal includes a precursor component prior to a main tap and a postcursor component subsequent to the main tap.

A decision-feedback equalizer which is capable of removing the effect caused by a postcursor component is disclosed in Non-patent document 1, for example. The decision-feedback equalizer judges a bit value represented by an input signal on the basis of the waveform of the input signal. Based on the determined bit value, the decision-feedback equalizer then removes the effect of the degradation of the waveform of the input signal which has already been received from the next input signal to be applied to the signal reception side.

Therefore, the decision-feedback equalizer can remove the effect caused by a postcursor component from a subsequently applied input signal by taking into consideration postcursor component that has already been determined. However, since a precursor component has not yet been determined, the effect caused by a precursor component cannot be removed from a subsequently applied input signal.

In order to fully eliminate the degradation of a signal due to intersymbol interference, it is necessary to remove the effect caused by a precursor component. To remove the effect caused by a precursor component, it has been customary to use waveform equalization on the signal transmission side which transmits signals. The waveform equalization on the signal transmission side is capable of equalizing waveforms, taking into consideration a precursor, because signals to be transmitted are known in advance.

A technology that is based on a combination of waveform equalization on a signal transmission side and waveform equalization on a signal reception side is disclosed in Non-patent document 2, for example. The technology disclosed in Non-patent document 2 is able to remove both the effect caused by a postcursor component and the effect caused by a precursor component by combining waveform equalization on a signal reception side and decision-feedback equalization on a signal transmission side. As a result, the degradation of a signal due to intersymbol interference can completely be eliminated.

PRIOR TECHNICAL DOCUMENTS

Non-Patent Documents

Non-patent document 1: Jihong Ren et al., "Precursor ISI Reduction in High-Speed I/O", Symposium on VLSI Circuits, pp. 134-135, June 2007

Non-patent document 2: Vladimir Stojanovich et al., "Adaptive Equalization and Data Recovery in a Dual-Mode (PAM2/4) Serial Link Transceiver", Symposium on VLSI Circuits, pp. 348-351, June 2004

SUMMARY OF THE INVENTION

Problems to be Solved by the Invention

In order to remove the effect caused by a precursor component on a signal transmission side according to the technology disclosed in Non-patent document 2, it is necessary to feed coefficients that are calculated on the basis of the waveform of an input signal from the signal reception side back to the signal transmission side because the effect caused by a precursor component is to be removed on the signal transmission side based on the waveform of the input signal.

The above solution is problematic in that the device of the signal reception side is large in scale and consumes increased electric power because of circuits and interconnections required for feedback.

It is an object of the present invention to provide an equalization device, an equalization method, and a program which are capable of removing the effect caused by a precursor component from an input signal applied to a signal reception side while at the same time avoiding an increase in circuit scale and an increase in electric power consumption.

Means for Solving the Problems

To achieve the above object, there is provided in accordance with the present invention an equalization device for receiving a signal transmitted from a signal transmission side as an input signal and for equalizing a degradation of the waveform of the received input signal, wherein the equalization device judges a bit value represented by the input signal on the basis of the waveform of the input signal according to a clock signal, detects a 2-bit transition signal in which two successive bit values are the same as each other and in which bit values prior and subsequent to the two successive bit values are different from those two successive bit values, from a judged signal that represents the judged bit value and that is made up of a plurality of bits, and brings the phase of the clock signal into synchronism with the phase of the detected 2-bit transition signal.

To achieve the above object, there is also provided in accordance with the present invention an equalization method in an equalization device for receiving a signal transmitted from a signal transmission side as an input signal and for equalizing a degradation of the waveform of the received input signal, comprising:

a judging process that judges a bit value represented by the input signal on the basis of the waveform of the input signal according to a clock signal; and a synchronizing process that detects a 2-bit transition signal in which two successive bit values are the same as each other and in which bit values prior and subsequent to the two successive bit values are different from those two successive bit values, from a judged signal that represents the judged bit value and that is made up of a plurality of bits, and brings the phase of the clock signal into synchronism with the phase of the detected 2-bit transition signal.

To achieve the above object, there is also provided in accordance with the present invention a program for enabling an equalization device for receiving a signal transmitted from a signal transmission side as an input signal and for equalizing a degradation of the waveform of the received input signal, to perform:

a judging function that judges a bit value represented by the input signal on the basis of the waveform of the input signal according to a clock signal; and a synchronizing function that detects a 2-bit transition signal in which two successive bit values are the same as each other and in which bit values prior and subsequent to the two successive bit values are different from those two successive bit values, from a judged signal that represents the judged bit value and that is made up of a plurality of bits, and brings the phase of the clock signal into synchronism with the phase of the detected 2-bit transition signal.

Advantages of the Invention

According to the present invention, the equalization device judges a bit value represented by an input signal on the basis of the waveform of the input signal according to a clock signal. Then, the equalization device detects a 2-bit transition signal in which two successive bit values are the same as each other and in which bit values prior and subsequent to the two successive bit values are different from those two successive bit values, from a judged signal that represents the judged bit value and that is made up of a plurality of bits, and brings the phase of the clock signal into synchronism with the phase of the detected 2-bit transition signal.

Consequently, it is possible to remove the effect caused by a precursor component from an input signal that is applied to a signal reception side while avoiding an increase in circuit scale and an increase in electric power consumption.

MODE FOR CARRYING OUT THE INVENTION

Exemplary embodiments of the present invention will be described below with reference to the drawings.

(First Exemplary Embodiment)

Figure 2:
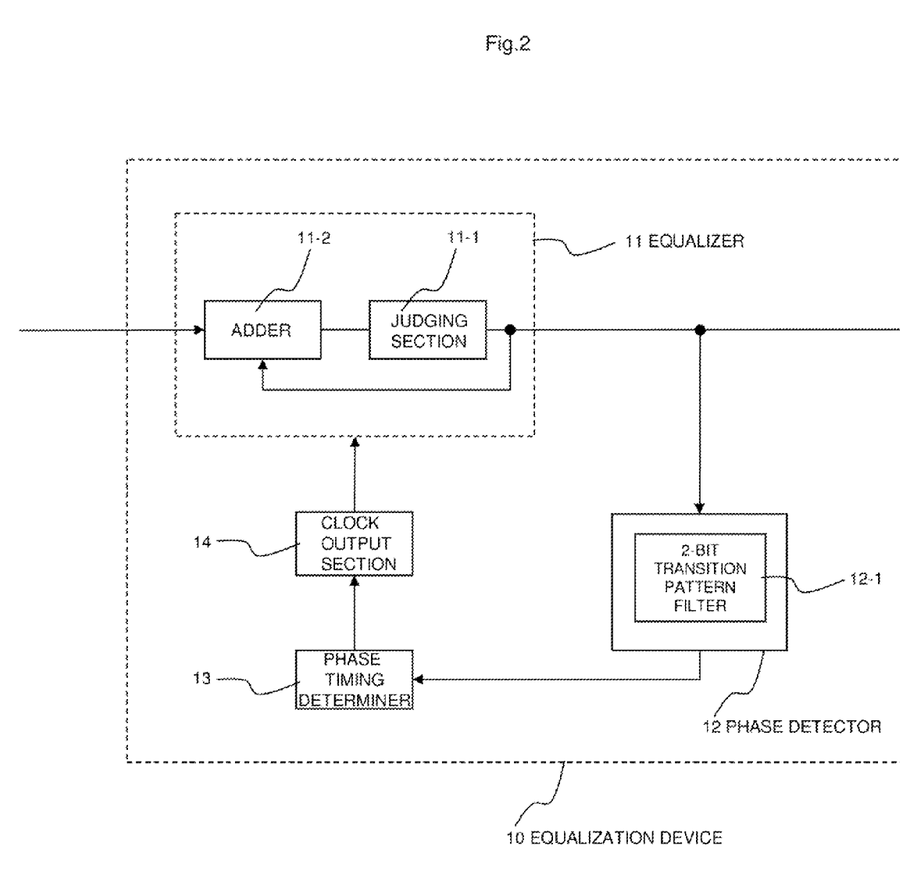
FIG. 2 is a block diagram showing an example of the configuration of an equalization device according to a first exemplary embodiment of the present invention.

FIG. 2 is a block diagram showing an example of the configuration of a first exemplary embodiment of an equalization device according to the present invention.

As shown in FIG. 2, equalization device 10 according to the present exemplary embodiment includes equalizer 11, phase detector 12 having 2-bit transition pattern filter 12-1, phase timing determiner 13, and clock output section 14.

In the present exemplary embodiment, equalizer 11 is compatible with a duo-binary transmission system. The duo-binary transmission system refers to a transmission system which allows intersymbol interference insofar as it occurs between adjacent signals. The duo-binary transmission system is thus capable of compressing a frequency band required to transmit signals between a signal transmission side and a signal reception side.

According to the duo-binary transmission system, the signal transmission side modulates data to be transmitted into a signal depending on a change in 2 adjacent bits, for example, of the data, and the modulated signal serves as an input signal applied to the signal reception side. The input signal represents any one value from amongst three values including "0", "1", and "2" depending on a change in bit value of 2 adjacent bits. Specifically, if both the bit values of 2 adjacent bits are "0", then an input signal "0" is applied to the signal reception side. If one of the bit values of 2 adjacent bits is "1" and the other "0", then an input signal "1" is applied to the signal reception side. If both the bit values of 2 adjacent bits are "1", then an input signal "2" is applied to the signal reception side.

Equalizer 11 includes judging section 11-1 which judges a bit value "0" or "1" on the basis of the waveform of the signal representing that is any one value from amongst three values and outputs a judged signal that represents the judged bit value and that is made up of a plurality of bits, and adder 11-2.

Adder 11-2 receives a signal transmitted from a signal transmission side as an input signal. Adder 11-2 adds the received input signal and the judged signal output from judging section 11-1 into a sum signal, and outputs the sum signal to judging section 11-1.

Judging section 11-1 receives the sum signal output from adder 11-2, and judges a bit value represented by the sum signal on the basis of the waveform of the received sum signal. Judging section 11-1 judges the bit value according to a clock signal output from clock output section 14. Judging section 11-1 outputs a judged signal to adder 11-2 and phase detector 12. Since judging section 11-1 feeds the judged signal back to adder 11-1, the effect caused by a postcursor component can be removed.

Phase detector 12 receives the judged signal output from equalizer 11, and detects a 2-bit transition signal from the received judged signal using 2-bit transition pattern filter 12-1. The 2-bit transition signal refers to a signal among judged signals, in which two successive bit values are the same as each other and in which bit values prior and subsequent to the two successive bit values are different from those two successive bit values. For example, a segment "11" of a bit string "0110" or a segment "00" of a bit string "1001" serves as a 2-bit transition signal. A 1-bit transition signal to be described later refers to a signal among judged signals, in which two successive bit values are different from each other. Phase detector 12 outputs phase information representative of the phase of a 2-bit transition signal at a common voltage threshold value to phase timing determiner 13. The common voltage threshold value refers to a central potential in a differential signal.

Phase timing determiner 13 receives phase information output from phase detector 12 and determines a timing to generate a clock signal based on the phase represented by the received phase information. Specifically, if the phase of the clock signal lags behind the phase represented by the received phase information, then phase timing determiner 13 adjusts the timing to generate the clock signal to advance the phase of the clock signal. If the phase of the clock signal leads the phase represented by the received phase information, then phase timing determiner 13 adjusts the timing to generate the clock signal to delay the phase of the clock signal. Phase timing determiner 13 outputs timing information representative of the determined timing to clock output section 14.

Clock output section 14 receives the timing information output from phase timing determiner 13, generates a clock signal at the timing represented by the received timing information, and outputs the generated clock signal to equalizer 11.

An operation sequence of equalization device 10 thus constructed for removing the effect caused by a precursor component will be described below.

Prior to describing the operation sequence for removing the effect of a precursor component, a situation free of an intersymbol interference will first be described below.

Figure 3:
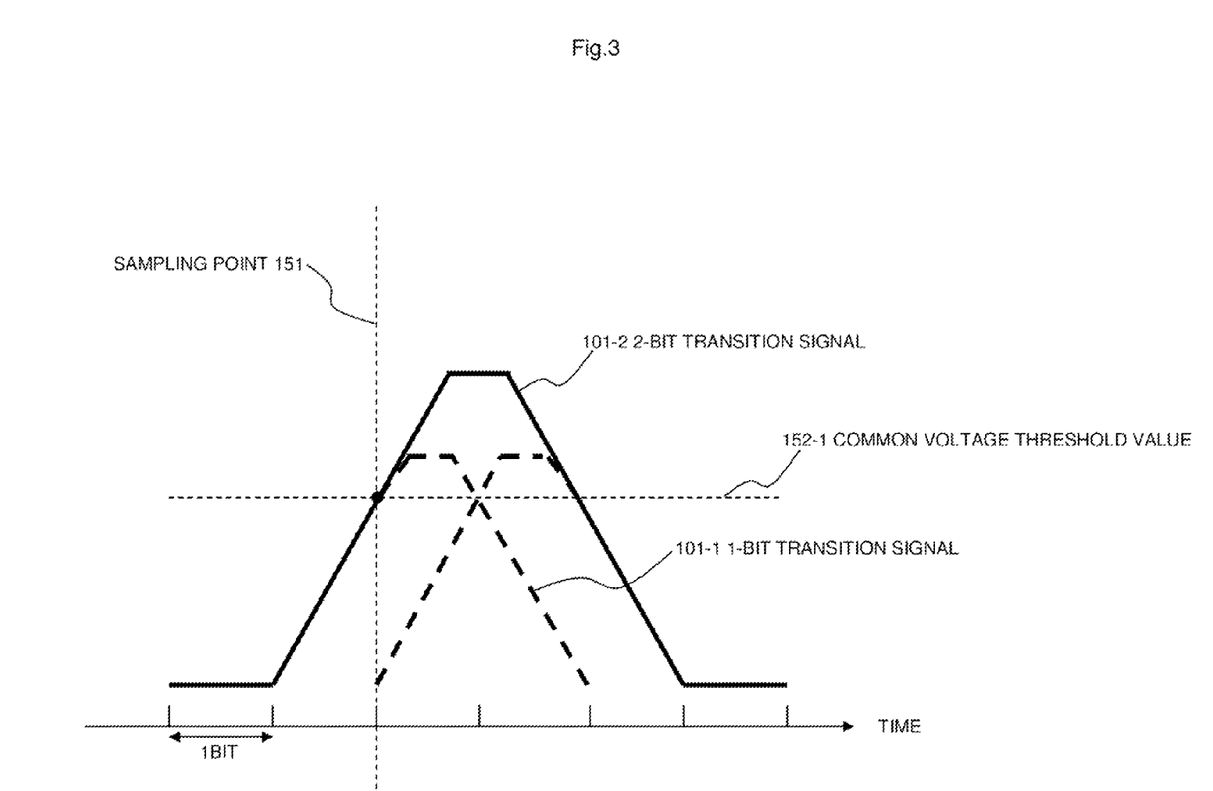
FIG. 3 is a diagram showing an example of a 2-bit transition signal and a 1-bit transition signal of a judged signal output from a judging section shown in FIG. 2.

FIG. 3 is a diagram showing an example of a 2-bit transition signal and a 1-bit transition signal of a judged signal output from judging section 11-1 shown in FIG. 2. FIG. 3 illustrates a situation where a precursor component does not cause any effect.

According to the present exemplary embodiment, since a duo-binary transmission system is employed, as described above, the sampling point for a main bit is located at a position indicated by sampling point 151. The main bit refers to a bit whose bit value is to be determined.

If a precursor component does not cause any effect, then 1-bit transition signal 101-1 and 2-bit transition signal 101-2 have positive-going edges that overlap each other at sampling point 151, as shown in FIG. 3. The overlapping positive-going edges of 1-bit transition signal 101-1 and 2-bit transition signal 101-2 at sampling point 151 indicate that a precursor component does not cause any effect.

Figure 4:
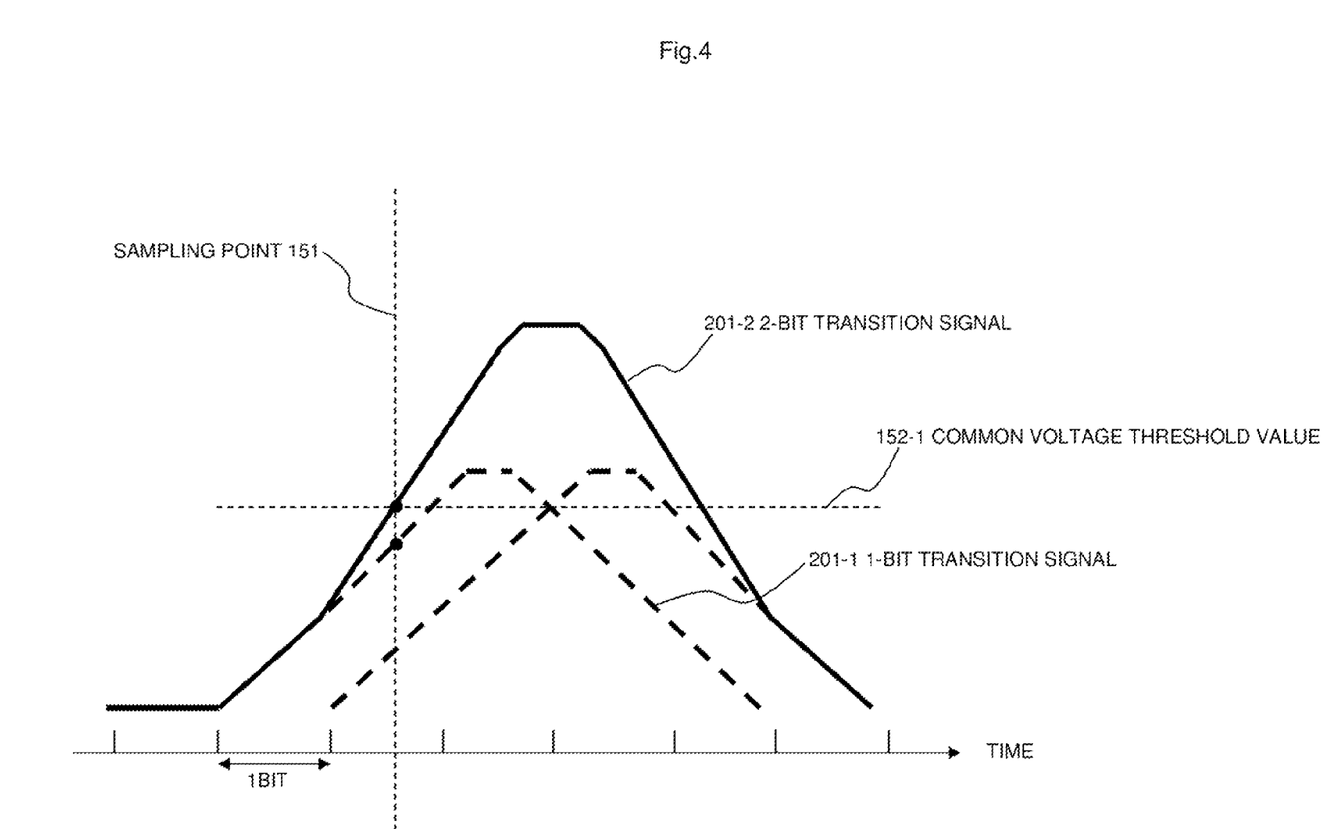
FIG. 4 is a diagram showing another example of a 2-bit transition signal and a 1-bit transition signal of a judged signal output from the judging section shown in FIG. 2.

FIG. 4 is a diagram showing another example of a 2-bit transition signal and a 1-bit transition signal of a judged signal output from judging section 11-1 shown in FIG. 2. FIG. 4 illustrates a situation where a precursor component causes some effect.

If a precursor component causes some effect, then 1-bit transition signal 201-1 and 2-bit transition signal 201-2 have positive-going edges that do not overlap each other at sampling point 151, as shown in FIG. 4. If sampling point 151 can be moved to a position where the positive-going edges of 1-bit transition signal 101-1 and 2-bit transition signal 101-2 overlap each other, then the effect caused by a precursor component can be removed.

Figure 5:
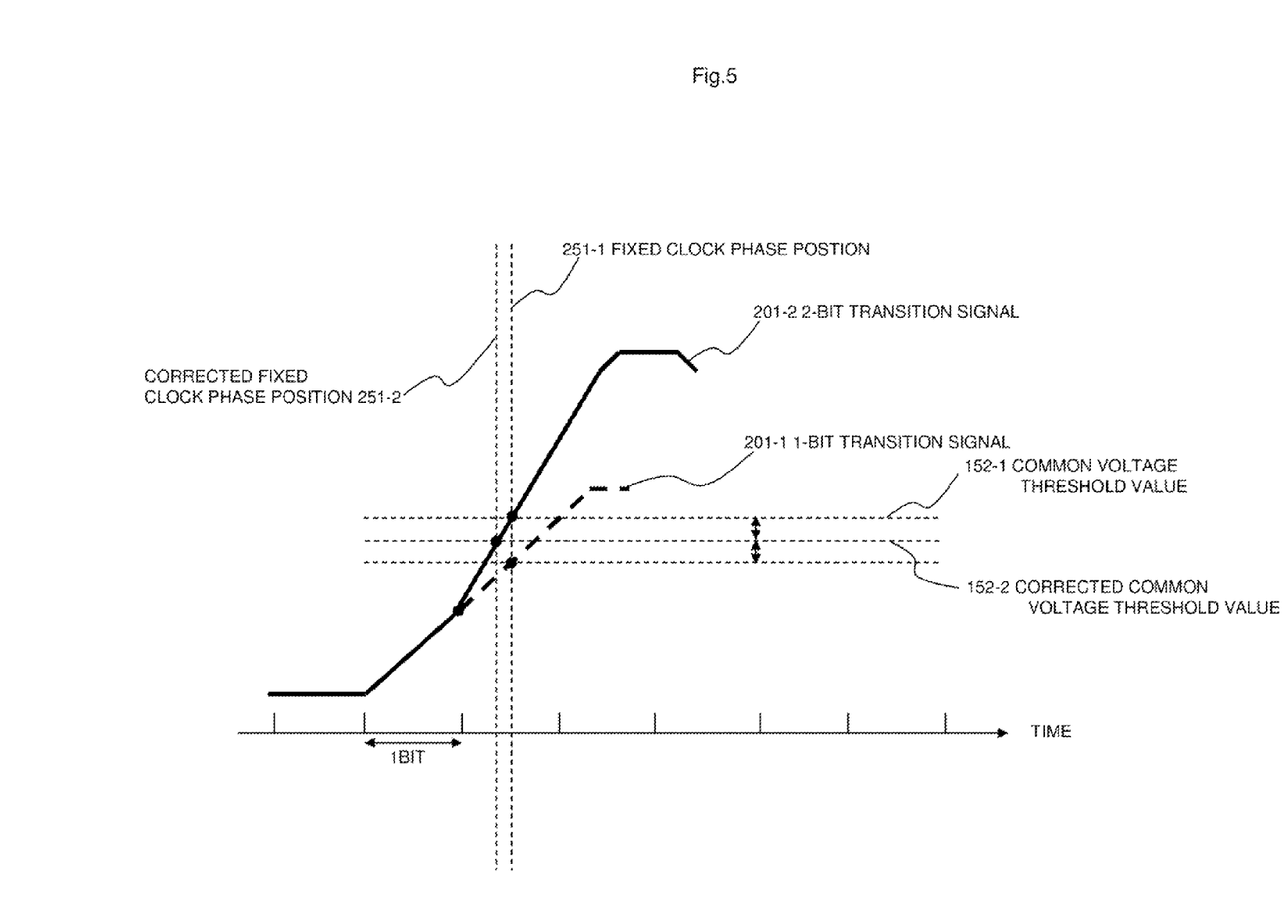
FIG. 5 is a diagram illustrative of an operation sequence for removing the effect caused by a precursor component in the example shown in FIG. 4.
Figure 6:
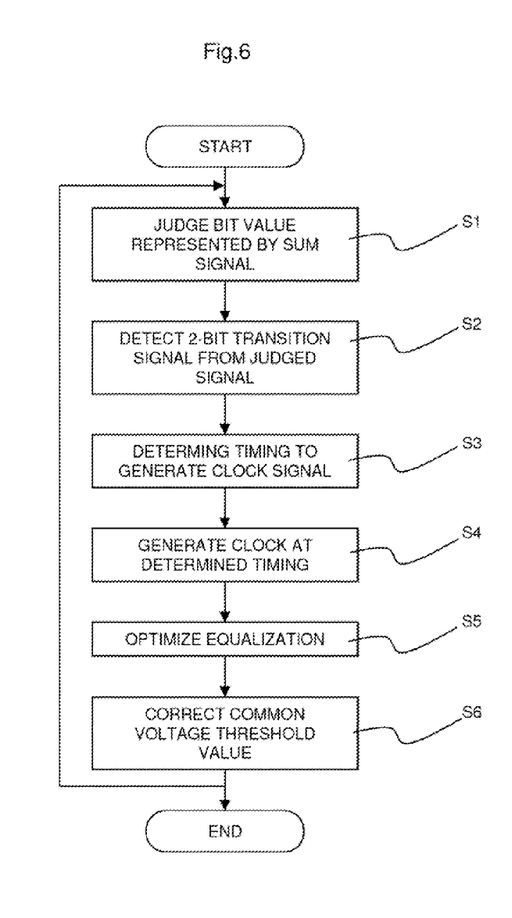
FIG. 6 is a flowchart of an operation sequence of the equalization device shown in FIG. 2 for removing the effect caused by a precursor component.

FIG. 5 is a diagram illustrative of an operation sequence for removing the effect caused by a precursor component in the example shown in FIG. 4. FIG. 6 is a flowchart of an operation sequence of equalization device 10 shown in FIG. 2 for removing the effect caused by a precursor component.

Adder 11-2 receives a signal transmitted from the signal transmission side as an input signal. Adder 11-2 adds the received input signal and the judged signal output from judging section 11-1 into a sum signal, and outputs the sum signal to judging section 11-1.

Judging section 11-1 receives the sum signal output from adder 11-2. Judging section 11-1 judges a bit value indicated by the sum signal on the basis of the waveform of the received sum signal according to the clock signal output from clock output section 14 (step S1).

Judging section 11-1 then outputs a judged signal to adder 11-2 and phase detector 12.

Phase detector 12 receives the judged signal output from judging section 11-1, and detects 2-bit transition signal 201-2 from the received judged signal using 2-bit transition pattern filter 12-1 (step S2).

Then, phase detector 12 outputs phase information representative of a phase at common voltage threshold value 152-1 of detected 2-bit transition signal 201-2, to phase timing determiner 13.

Phase timing determiner 13 receives the phase information output from phase detector 12, and determines a timing to generate a clock signal based on the phase indicated by the received phase information (step S3). The phase of the clock signal is now fixed at fixed clock phase position 251-1.

Phase timing determiner 13 outputs timing information, which represents that fixed clock phase position 251-1 indicates a timing to generate a clock signal, to clock output section 14.

When clock output section 14 receives the timing information output from phase timing determiner 13, clock output section 14 generates a clock signal at the timing indicated by the received timing information (step S4). Clock output section 14 outputs the generated clock signal to equalizer 11.

Then, equalization in judging section 11-1 is optimized depending on a change in the phase of the clock signal output from clock output section 14 (step S5).

The optimization of equalization in step S5 corrects common voltage threshold value 152-1 (step S6). Specifically, an intermediate value between the voltage value of 2-bit transition signal 201-2 at fixed clock phase position 251-1 and the voltage value of 1-bit transition signal 201-1 serves as corrected common voltage threshold value 152-2.

Then, control goes back to step S1 in which judging section 11-1 judges a bit value indicated by the sum signal on the basis of the waveform of the received sum signal according to the clock signal output from clock output section 14.

In step S6, common voltage threshold value 152-1 is corrected into corrected common voltage threshold value 152-2. The phase at corrected common voltage threshold value 152-2 of 2-bit transition signal 201-2 now becomes different from the phase at common voltage threshold value 152-1. The fixed position of the phase of the clock signal also becomes corrected fixed clock phase position 251-2. Corrected common voltage threshold value 152-2 is also corrected.

The operation sequence in steps S1 through S6 is repeated to cause the phase of the clock signal to approach the phase of the 2-bit transition signal until the phase of the clock signal to approach the phase of the 2-bit transition signal are brought into synchronism with each other. Now, the positive-going edges of 1-bit transition signal 201-1 and 2-bit transition signal 201-2 overlap each other, thereby removing the effect caused by a precursor component.

According to the present exemplary embodiment, equalization device 10 judges the bit value indicated by the input signal on the basis of the waveform of the input signal according to the clock signal. Equalization device 10 then detects a 2-bit transition signal in which two successive bit values are the same as each other and in which bit values prior and subsequent to the two successive bit values are different from those two successive bit values, from the judged signal that represents the judged bit value and that is made up of a plurality of bits, and brings the phase of the clock signal into synchronism with the phase of the detected 2-bit transition signal.

Consequently, it is possible to remove the effect caused by a precursor component from an input signal that is applied to the signal reception side while avoiding an increase in circuit scale and an increase in electric power consumption.

In the present exemplary embodiment, equalizer 11 has one judging section and one adder. However, equalizer 11 may be of an n-phase configuration (n is a natural number) that has a plurality of judging sections and a plurality of adders.

Figure 7:
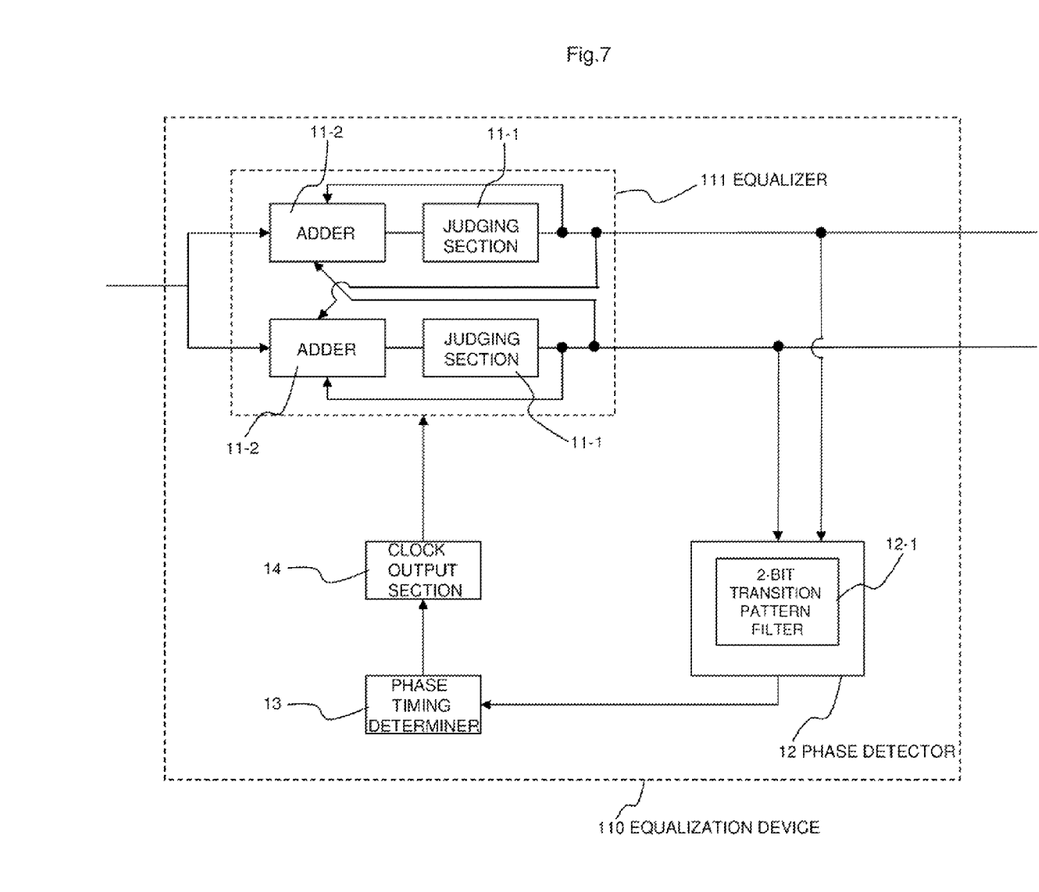
FIG. 7 is a block diagram showing another example of the configuration of the equalization device according to the first exemplary embodiment of the present invention.

FIG. 7 is a block diagram showing another example of the configuration of the first exemplary embodiment of the equalization device according to the present invention. Equalization device 10 shown in FIG. 7 includes two phases of the circuit configuration of equalization device 10 shown in FIG. 2.

As shown in FIG. 7, equalizer 111 has two judging sections 11-1 and two adders 11-2 for removing the effect caused by a precursor component in two stages. Phase detector 12, phase timing determiner 13, and clock output section 14 for removing the effect caused by a precursor component are identical in configuration and operation to those of equalizer 10 shown in FIG. 2, and will not be described below.

The equalizer of the n-phase configuration according to the present exemplary embodiment is also capable of removing the effect caused by a precursor component from an input signal that is applied to the signal reception side while avoiding an increase in circuit scale and an increase in electric power consumption.

(Second Exemplary Embodiment)

Figure 8:
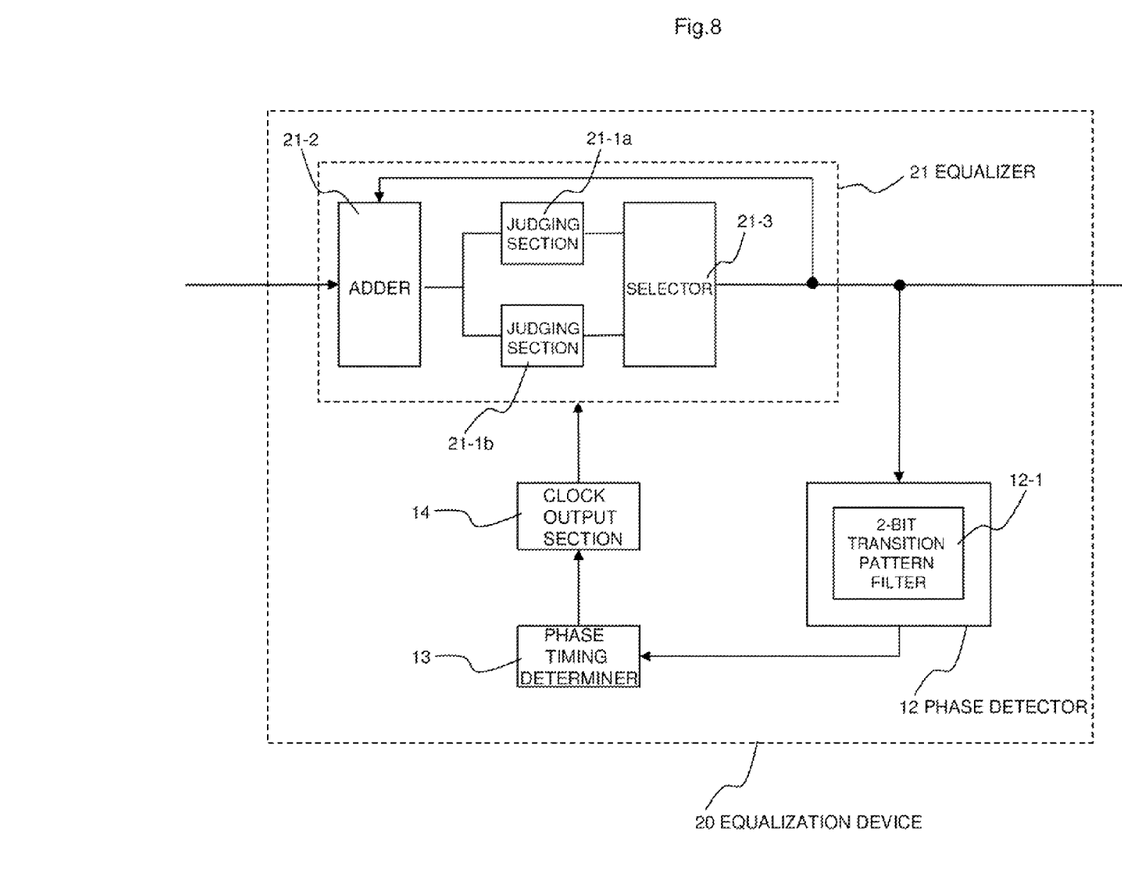
FIG. 8 is block diagram showing an example of the configuration of an equalization device according to a second exemplary embodiment of the present invention.

FIG. 8 is block diagram showing an example of the configuration of an equalization device according to a second exemplary embodiment of the present invention.

In the first exemplary embodiment, the equalization device includes judging section 11-1 which is compatible with a duo-binary transmission system. According to the present exemplary embodiment, the equalization deice includes first judging section 21-1a and second judging section 21-1b instead of judging section 11-1, and also includes selector 21-3.

Judging section 21-1a receives the sum signal output from adder 21-2, and judges a bit value represented by the sum signal on the basis of the waveform of the received sum signal according to the clock signal output from clock output section 14. At this time, judging section 21-1a judges a bit value based on a first voltage threshold value, which is produced by increasing a threshold value for determining the bit value by a voltage value corresponding to a first postcursor included in the input signal. Judging section 21-1a outputs a first judged signal, which represents the judged bit value and which is made up of a plurality of bits, to selector 21-3.

Judging section 21-1b receives the sum signal output from adder 21-2, and judges a bit value represented by the sum signal on the basis of the waveform of the received sum signal according to the clock signal output from clock output section 14. At this time, judging section 21-1b judges a bit value based on a second voltage threshold value, which is produced by reducing the threshold value for determining the bit value by the voltage value corresponding to the first postcursor included in the input signal. Judging section 21-1b outputs a second judged signal, which represents the judged bit value and which is made up of a plurality of bits, to selector 21-3.

Selector 21-3 receives the first judged signal output from judging section 21-1a and the second judged signal output from judging section 21-1b. Selector 21-3 selects the first judged signal or the second judged signal for each bit. Selector 21-3 determines which signal's bit is to be selected based on the bit value of a preceding bit that has already been selected. Selector 21-3 outputs a signal indicative of the bit value of a selected bit as a judged signal to adder 21-2 and phase detector 12.

According to the present exemplary embodiment, equalizer 21 performs speculative execution. The speculative execution generally refers to the execution by a computer of a code the result of which may actually be discarded by the computer. According to the present exemplary embodiment, equalizer 21 judges a bit value indicated by an input signal based on a value which is produced by increasing or reducing a common voltage threshold value by a voltage value corresponding to the first postcursor. Equalizer 21 selects a result in which the input signal is properly equalized. In other words, equalizer 21 discards a result in which the input signal is not properly equalized.

In the present exemplary embodiment, judging sections 21-1a, 21-1b make their judgments by taking into consideration the voltage value that corresponds to the first postcursor. In other words, a signal that includes the effect caused by the first postcursor is output as a judged signal to phase detector 12. Therefore, according to the present exemplary embodiment, as with the first exemplary embodiment described above, the judged signal includes a 1-bit transition signal and a 2-bit transition signal.

Consequently, since phase detector 12, phase timing determiner 13, and clock output section 14 operate in the same manner as with the first exemplary embodiment, it is possible to remove the effect caused by a precursor component from an input signal that is applied to the signal reception side while avoiding an increase in circuit scale and an increase in electric power consumption.

In the present exemplary embodiment, as with the first exemplary embodiment, the equalizer may be of an n-phase configuration (n is a natural number) that has a plurality of sets of judging sections 21-1a, 21-1b, adder 21-2, and selector 21-3.

Figure 9:
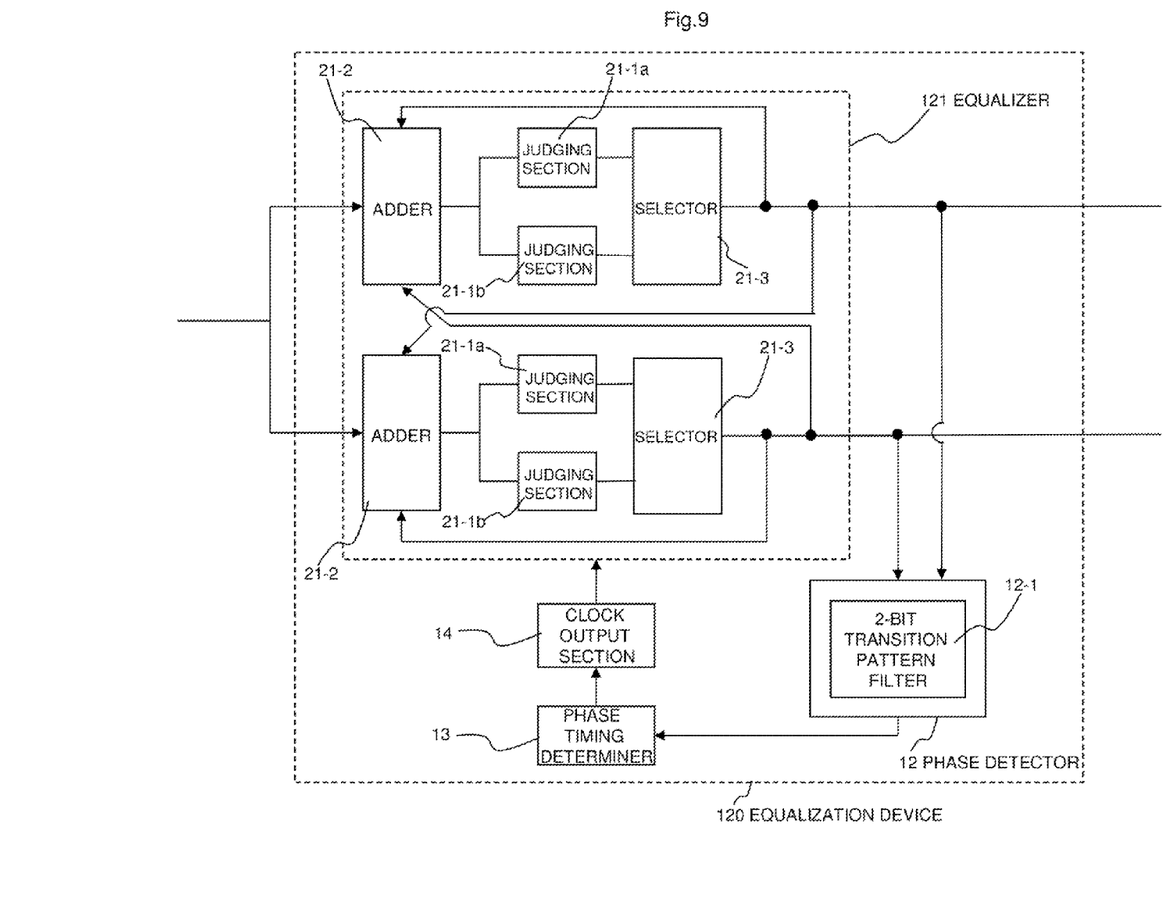
FIG. 9 is block diagram showing another example of the configuration of the equalization device according to the second exemplary embodiment of the present invention.

FIG. 9 is block diagram showing another example of the configuration of the equalization device according to the second exemplary embodiment of the present invention. Equalization device 120 shown in FIG. 9 includes two phases of the circuit configuration of equalization device 20 shown in FIG. 8.

As shown in FIG. 9, equalizer 121 has two judging sections 21-1a, 21-1b, two adders 21-2, and two selectors 21-3 for removing the effect caused by a precursor component in two stages. Phase detector 12, phase timing determiner 13, and clock output section 14, in order to remove the effect caused by a precursor component are identical in configuration and operation to those of equalizer 20 shown in FIG. 8, and will not be described below.

The equalizer of the n-phase configuration according to the present exemplary embodiment is also capable of removing the effect caused by a precursor component from an input signal that is applied to the signal reception side while avoiding an increase in circuit scale and an increase in electric power consumption.

In the first exemplary embodiment and the second exemplary embodiment, equalizers 11, 111 and equalizers 21, 121 are compatible with a duo-binary transmission system, and determine a bit value on the basis of the waveform of a signal representing three values.

Equalizers 11, 111 according to the first exemplary embodiment may judge a bit value on the basis of the waveform of a signal representing two values. In this case, judging section 11-1 may judge a bit value and a waveform transition to detect a 2-bit transition signal. The effect caused by a precursor component can be removed by synchronizing the phase of the detected 2-bit transition signal and the phase of the clock signal with each other.

Likewise, equalizers 21, 121 according to the second exemplary embodiment may judge a bit value on the basis of the waveform of a signal representing two values. In this case, judging section 21-1a, 21-1b may judge a bit value and a waveform transition to detect a 2-bit transition signal. The effect caused by a precursor component can be removed by synchronizing the phase of the detected 2-bit transition signal and the phase of the clock signal with each other.

According to the present invention, the processing sequence in the equalization device may be implemented by the dedicated hardware described above, and may also be implemented by recording programs for realizing the functions of the equalization device in a recording medium which can be read by the equalization device, reading the programs recorded in the recording medium into the equalization device, and executing the read programs. The recording medium which can be read by the equalization device may be a removable recording medium such as a flexible disk, a magnetooptical disk, a DVD, a CD, or the like, or an HDD or the like incorporated in the equalization device.

Although the present invention has been described above with reference to the exemplary embodiments, the present invention should not be limited to the above exemplary embodiments. Various changes that can be understood by those skilled in the art can be made to the arrangement and details of the present invention within the scope of the invention.

This application is based upon and claims the benefit of priority from Japanese Patent Application No. 2009-148629 filed on Jun. 23, 2009, the entire disclosure of which is incorporated herein by reference.

The invention claimed is:

1. An equalization device for receiving a signal transmitted from a signal transmission side as an input signal and for equalizing a degradation of a waveform of the received input signal, said qualization device comprising:
   a clock output section that outputs a clock signal;
   an equalizer that judges a bit value represented by said input signal on the basis of the waveform of the input signal according to said clock signal which is output from said clock output section, and outputs a judged signal that represents the judged bit value and that is made up of a plurality of bits;
   a phase detector that receives the judged signal output from said equalizer, detects a 2-bit transition signal, in which two successive bit values are identical to each other and in which bit values prior and subsequent to the two successive bit values are different from the two successive bit values, from the received judged signal, and output phase information representative of the phase of the detected 2-bit transition signal at a voltage threshold value which changes depending on a change in the phase of said clock signal; and
   a phase timing determiner that receives the phase information output from said phase detector, determines a timing to generate said clock signal based on the phase represented by the received phase information, and outputs timing information representative of the determined timing;
   wherein said clock output section generates said clock signal at the timing represented by the timing information output from said phase timing determiner.

2. The equalization device according to claim 1, wherein said equalizer includes:
   an adder that receives said input signal and said judged signal and outputs a sum signal produced by adding the received input signal and the received judged signal; and
   a judging section that judges a bit value represented by said sum signal on the basis of the waveform of the sum signal according to said clock signal and outputs the judged bit value as said judged signal.

3. The equalization device according to claim 1, wherein said equalizer includes:
   an adder that receives said input signal and said judged signal and outputs a sum signal produced by adding the received input signal and the received judged signal;
   a first judging section that judges a bit value represented by said sum signal on the basis of the waveform of the sum signal according to said clock signal, based on a first voltage threshold value depending on a change in the voltage value of said input signal due to a postcursor included in the input signal, and outputs a first judged signal which represents the judged bit value and which is made up of a plurality of bits;
   a second judging section that judges a bit value represented by said sum signal on the basis of the waveform of the sum signal, based on a second voltage threshold value, different from said first voltage threshold value, depending on the change in the voltage value of said input signal due to the postcursor included in the input signal, and outputs a second judged signal which represents the judged bit value and which is made up of a plurality of bits; and
   a selector that selects said first judged signal or said second judged signal for each bit, and outputs a signal representing the bit value of a selected bit as said judged signal.

4. The equalization device according to claim 3, wherein said selector selects said first judged signal or said second judged signal for each bit based on the bit value of a bit selected prior to the bit to be selected.

5. An equalization method in an equalization device for receiving a signal transmitted from a signal transmission side as an input signal and for equalizing a degradation of the waveform of the received input signal, comprising:
   a judging step that judges a bit value represented by said input signal on the basis of the waveform of the input signal according to a clock signal; and
   a synchronizing step that detects a 2-bit transition signal in which two successive bit values are the same as each other and in which bit values prior and subsequent to the two successive bit values are different from those two successive bit values, from a judged signal that represents the judged bit value and that is made up of a plurality of bits, and brings the phase of the clock signal into synchronism with the phase of the detected 2-bit transition signal.

6. The equalization method according to claim 5, wherein said synchronizing step includes:
   a step that detects said 2-bit transition signal from said judged signal; and
   a step that determines a timing to generate said clock signal based on the phase of the detected 2-bit transition signal at a voltage threshold value which changes depending on a change in the phase of said clock signal.

7. The equalization method according to claim 6, wherein said judging step includes:
- a step that adds said input signal and said judged signal into a sum signal; and
- a step that judges a bit value represented by said sum signal on the basis of the waveform of said sum signal according to said clock signal, and uses the judged bit signal as said judged signal.

8. The equalization method according to claim 6, wherein said judging step includes:
- a step that adds said input signal and said judged signal into a sum signal;
- a step that judges a bit value represented by said sum signal on the basis of the waveform of the sum signal according to said clock signal, based on a first voltage threshold value depending on a change in the voltage value of said input signal due to a postcursor included in the input signal, and generates a first judged signal which represents the judged bit value and which is made up of a plurality of bits;
- a step that judges a bit value represented by said sum signal on the basis of the waveform of the sum signal, based on a second voltage threshold value, different from said first voltage threshold value, depending on a change in the voltage value of said input signal due to the postcursor included in the input signal, and generates a second judged signal which represents the judged bit value and which is made up of a plurality of bits; and
- a selecting step that selects said first judged signal or said second judged signal for each bit, and outputs a signal representing the bit value of a selected bit as said judged signal.

9. The equalization method according to claim 8, wherein said selecting step is:
- a function that selects said first judged signal or said second judged signal for each bit based on the bit value of a bit selected prior to the bit to be selected.

10. A non-transitory computer readable recording medium in which a program is recorded, said program for enabling an equalization device for receiving a signal transmitted from a signal transmission side as an input signal and for equalizing a degradation of the waveform of the received input signal, to perform:
- a judging function that judges a bit value represented by said input signal on the basis of the waveform of the input signal according to a clock signal; and
- a synchronizing function that detects a 2-bit transition signal in which two successive bit values are the same as each other and in which bit values prior and subsequent to the two successive bit values are different from those two successive bit values, from a judged signal that represents the judged bit value and that is made up of a plurality of bits, and brings the phase of the clock signal into synchronism with the phase of the detected 2-bit transition signal.

11. The non-transitory computer readable recording medium according to claim 10, wherein said synchronizing function includes:
- a function that detects said 2-bit transition signal from said judged signal; and
- a function that determines a timing to generate said clock signal based on the phase of the detected 2-bit transition signal at a voltage threshold value which changes depending on a change in the phase of said clock signal.

12. The non-transitory computer readable recording medium according to claim 11, wherein said judging function includes:
- a function that adds said input signal and said judged signal into a sum signal; and
- a function that judges a bit value represented by said sum signal on the basis of the waveform of said sum signal according to said clock signal, and uses the judged bit signal as said judged signal.

13. The non-transitory computer readable recording medium according to claim 11, wherein said judging function includes:
- a function that adds said input signal and said judged signal into a sum signal;
- a function that judges a bit value represented by said sum signal on the basis of the waveform of the sum signal according to said clock signal, based on a first voltage threshold value depending on a change in the voltage value of said input signal due to a postcursor included in the input signal, and generates a first judged signal which represents the judged bit value and which is made up of a plurality of bits;
- a function that judges a bit value represented by said sum signal on the basis of the waveform of the sum signal, based on a second voltage threshold value, different from said first voltage threshold value, depending on a change in the voltage value of said input signal due to the postcursor included in the input signal, and generates a second judged signal which represents the judged bit value and which is made up of a plurality of bits; and
- a selecting function that selects said first judged signal or said second judged signal for each bit, and outputs a signal representing the bit value of a selected bit as said judged signal.

14. The non-transitory computer readable recording medium according to claim 13, wherein said selecting function is:
- a function that selects said first judged signal or said second judged signal for each bit based on the bit value of a bit selected prior to the bit to be selected.

* * * * *